United States Patent

Van Dusen, Jr.

[15] 3,679,311
[45] July 25, 1972

[54] AMBIENT CONTAMINANT COLLECTING DEVICE

[72] Inventor: Harold A. Van Dusen, Jr., South Milwaukee, Wis.
[73] Assignee: McGraw-Edison Company, Milwaukee, Wis.
[22] Filed: Feb. 11, 1971
[21] Appl. No.: 114,542

[52] U.S. Cl. .................................356/36, 55/270, 55/274, 55/319, 55/468, 356/244
[51] Int. Cl. .........................................G01n 1/18
[58] Field of Search.................356/36, 38, 244; 73/170 R, 73/28, 432 PS; 55/270, 274, 468, 319

[56] References Cited

OTHER PUBLICATIONS

Dust is Dangerous, 1954, pp. 18–28.

Primary Examiner—Ronald L. Wibert
Assistant Examiner—Orville B. Chew, II
Attorney—R. J. Falkowski

[57] ABSTRACT

An ambient particulate density measuring device has a chamber for collecting solid particle contaminants precipitated from an air flow pumped by an omnidirectional venturi located at the top of the chamber. The venturi is formed between a cover plate positioned above a curved external top of the chamber having a hole at its center that extends into the chamber. The chamber has a wind and rain shielded air inlet and has a glass bottom of two sections with an internal section exposed to the contaminants precipitated within the chamber and an external section exposed to contaminants outside the chamber. The bottom is removable so that transmission of light through the two pieces may be measured to give a determination of both particulate density within the chamber and ambient contaminant effects on the external section.

13 Claims, 3 Drawing Figures

PATENTED JUL 25 1972

3,679,311

*INVENTOR.*
HAROLD A. VAN DUSEN, JR.

BY R J Falbowski

ATTORNEY

AMBIENT CONTAMINANT COLLECTING DEVICE

This invention relates to devices for sampling ambient contaminants or pollutants, particularly to devices that are adapted to calibrate the contamination of solid pollutants and the effects of solids and other pollutants on selected materials.

Several devices for measuring contaminants and pollutants in the atmosphere are known. A typical device for measuring suspended particles in the ambient air uses a powerful suction blower to pass air through a filter. The measure of the contamination level is determined by weighing the material trapped by the filter for the quantity of air passed through the filter. Devices of this general type are complex and costly and require a significant power source. The determination of the weight also requires availability of precision laboratory equipment with the accompanying increased costs and inconvenience.

A device according to this invention is relatively inexpensive, does not require a power source, can be easily placed wherever desired, and requires relatively unsophisticated measuring equipment for measuring light transmission through a glass or other type of transparent plate. The light transmission measurement can provide an indication of both the particulate precipitation related to the solid particle level in the atmosphere and the effects of contaminants in the atmosphere on any desired transparent material. Since the device according to this invention is simple, inexpensive and convenient, measurements at many places in a given area enable obtaining of a realistic broad sampling of an area tested.

While a measuring device according to this invention is particularly applicable to determining the effects of ambient conditions on luminaire assemblies, it also may be used to determine the effect of atmosphere contaminants and particulate contaminant levels for other purposes. For example, selected absorbing or reacting materials can be placed within the chamber to obtain samples and quantity measurements of gaseous contaminants.

Other objects and advantages of this invention will be apparent from the following detailed description.

Figure 1:
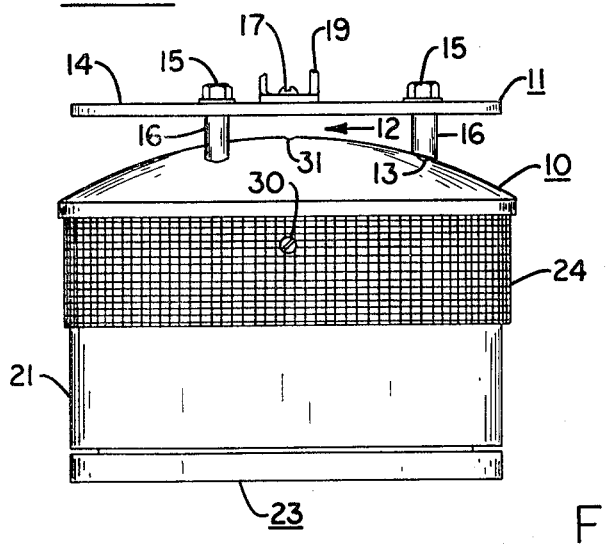
FIG. 1 is a side view of a measuring device according to this invention.
Figure 2:
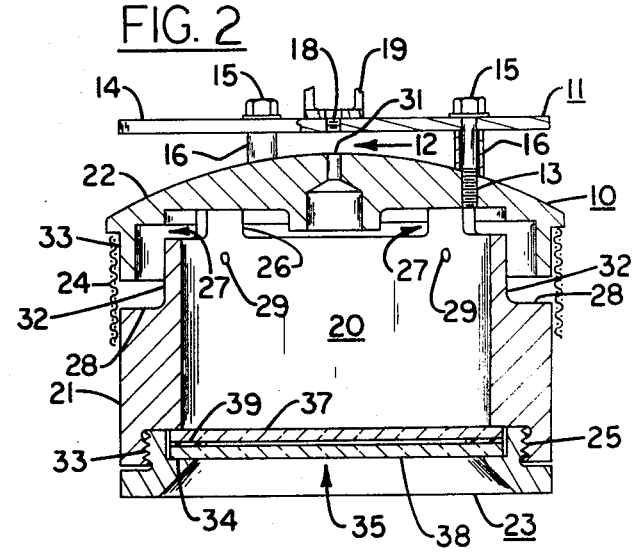
FIG. 2 is a cross-sectional side view of the device shown in FIG. 1.
Figure 3:
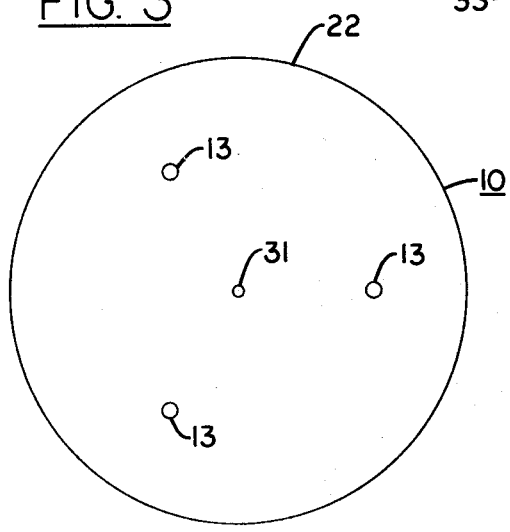
FIG. 3 is a top view of the device shown in FIG. 1 with the top baffle assembly removed.

Referring to the drawing, the measuring device has a main housing assembly 10 and a baffle assembly 11 forming an omnidirectional venturi 12 between the housing assembly and the baffle assembly. The baffle assembly comprises a baffle plate 14; a means for connecting the baffle plate to and spacing it from the housing assembly, such as bolts 15, bolt taps 13 in housing assembly 10, and spacers 16 of a length selected to provide desired venturi characteristics; and a means for mounting the measuring device on a connecting structure 19, such as a bolt 17 and a bolt tap 18.

Main housing assembly 10 comprises a cylindrical chamber wall 21 forming a collection chamber 20, a top cover 22, a bottom plate assembly 23, and a screen 24. Chamber wall 21 may be of any desired or convenient configuration and comprises upwardly extending lips 26 that meet top cover 22 to provide air inlet circulation openings 27 between wall 21 and top cover 22. Wall 21 has an outer circumferential shoulder 28 and a circumferentially recessed wall 32 that provide an open path through screen 24 and openings 27 to collection chamber 20. A means for connecting top cover 22 to wall 21 is provided, such as bolt taps 29 in wall 21 and bolts 30. Wall 21 has a threaded portion 25 adapted to receive threaded bottom plate assembly 23.

Top cover 22 has a downwardly extending annular lip 33 that shields openings 27 and a venturi hole 31 at the center of the curved top of top cover 22 that may be of any known selected configuration to provide the desired size opening and air flow characteristics. The 360°, or omnidirectional, venturi therefore comprises baffle plate 14, venturi opening 31, and the top curved surface of cover 22 and is adjustable by selection of spacers 16, size of opening 31, and the size and configuration of the air flow path through air inlet openings 27.

Bottom plate assembly 23 is attached to wall 21 in any known manner such as by a threaded portion 33 that is received by threaded portion 25 of wall 21 and has an internal annular shoulder 34 and an open central portion 35. An inner removable transparent, or reactive, plate 37 forms the bottom of collection chamber 20 with its upper surface, and an outer removable transparent, or reactive, plate 38 is adjacent the lower surface of plate 37 and forms the outside bottom of housing assembly 10. Plates 37 and 38 could also be treated with reactive or absorbing material to measure other effects of contaminants in the atmosphere. An annular gasket 39 is inserted as a seal between plates 37 and 38.

In utilizing the measuring device, the device may be placed, usually from overhead hangers, at various places in an area to be tested. The 360° venturi components are selected as to the size of hole 31, the configuration of cylinder 32, and the length of spacers 16. The velocity of the air through the venturi, preferably from normal air movement, creates a low pressure region in venturi 12 causing an exhaust air flow from chamber 20 through venturi hole 31. Air therefore flows through openings 27 at a very low velocity into chamber 20 where, because of the relatively large chamber size, the air motion is sufficiently slow to precipitate most of the particulate matter present.

In order to maintain the air velocity in chamber 20 at a sufficiently low level, air inlet openings 27 are shielded from direct wind impingement by screen 24 and recessed wall 32. The air flow into chamber 20 and possible air turbulence in chamber 20 is further controlled because air entering on the upwind side flows around the outside through the torus shaped chamber formed by shoulder 28 and recessed wall 32 and is discharged on the downward side. Screen 24 also is selected to prevent the entry of insects into chamber 20.

After a selected period of time perhaps two to four weeks, for testing the effects of the atmosphere on devices such as luminaires, the glass plates are removed and a transparency measurement is made and compared to an earlier transparency measurement. The information is correlated to known data to give a measurement of the particle level in the atmosphere, the effect of the particles on glass plates, and the deterioration of the glass plate caused by the atmospheric contaminants.

The effect on the glass plates has particular application to luminaires because the materials used for the plates can be identical to the material used in luminaires, thereby requiring little correlation to other factors. It would, for example, give a direct indication of how often luminaires should be cleaned and how often the transparent housings should be replaced. However, the information obtained from the precipitant on the plate could also be correlated to other types of information desired, such as to determine the amount of solid contaminants in a given atmosphere or, with further analysis, to determine the type of contaminants present.

If desired, a means for determining wind velocity could be incorporated with the device so that the effect of the wind on the precipitation rate could be correlated to give more accurate indications on the particle contamination in a given area. However, the average wind over a given period of time would normally be sufficient to correlate the effects on the glass plate.

The lower glass plate has particular application to determine the effect on light transmission of luminaires from exposure to the external atmosphere, not only from solid deposits, but also from chemical changes. The lower glass plate is removed and the transparency change measured to determine the effects of the atmosphere on the plate over the tested period. While this is particularly beneficial to the determination of the effects on luminaires, it can also be utilized to determine the effect on different transparent materials.

I claim

1. An ambient contaminant collecting device comprising a housing forming a collection chamber and having a curved top, an opening in the top, an air inlet opening, and an internal removable plate attached to form the bottom of the collection chamber; and a baffle plate connected and selectively positioned above the curved top to form an exhaust venturi with the opening, curved top, circulation opening and collection chamber.

2. An ambient contaminant collecting device according to claim 1 wherein said housing is a cylindrical housing.

3. An ambient contaminant collecting device according to claim 1 wherein said baffle plate and curved top form a 360° venturi.

4. An ambient contaminant collecting device according to claim 1 wherein said internal plate is removable.

5. An ambient contaminant collecting device according to claim 4 wherein said internal plate is transparent.

6. An ambient contaminant collecting device according to claim 5 wherein said internal plate is a glass plate.

7. An ambient contaminant collecting device according to claim 1 comprising an external plate positioned below the internal plate and adjacent the lower surface of the internal plate to isolate the lower surface of said internal plate from the atmosphere.

8. An ambient contaminant collecting device according to claim 1 also comprising a screen connected and positioned to cover the air inlet opening.

9. An ambient contaminant collecting device comprising a collection chamber having air inlet openings, an exhaust venturi in communication with the chamber, and a removable transparent plate forming the bottom of the collection chamber.

10. An ambient contaminant collecting device according to claim 9 wherein said venturi is a 360° venturi.

11. An ambient contaminant collecting device according to claim 9 also comprising a second plate below the removable plate positioned to isolate said removable plate bottom from the atmosphere.

12. An ambient contaminant collecting device according to claim 11 wherein said second plate is transparent.

13. An ambient contaminant collecting device comprising:
a cylindrical housing having a curved top, a venturi hole in the top, a cylindrical wall, and a removable transparent bottom plate forming a cylindrical chamber, said wall having an outwardly positioned cylindrical shoulder, a cylindrically recessed wall extending upwardly from said shoulder toward the top of said chamber, and spaced apart projecting lips extending upwardly from said wall to form air openings into said chamber between said lips, and said top having a downwardly extending cylindrical lip extending over said air openings;
a cover plate attached to the housing to cover the bottom of the transparent plate;
a baffle plate connected to and spaced apart from the top to form a venturi passage for the venturi hole; and
a cylindrical screen covering the opening formed between the top and the cylindrical wall.

* * * * *